US005777787A

United States Patent [19]
Lüder et al.

[11] Patent Number: 5,777,787
[45] Date of Patent: Jul. 7, 1998

[54] APPARATUS AND PROCESS FOR AUTOSTEREOSCOPIC VIEWING OF A THREE-DIMENSIONAL STRUCTURE

[75] Inventors: Ernst Lüder, Stuttgart; Gerhard Bader, Neuffen, both of Germany

[73] Assignee: Ernst Lueder, Stuttgart, Germany

[21] Appl. No.: 605,815

[22] Filed: Feb. 22, 1996

[30] Foreign Application Priority Data

Feb. 25, 1995 [DE] Germany ............... 195 06 648.0

[51] Int. Cl.⁶ .................... G02B 27/22; G02B 35/00
[52] U.S. Cl. ........................... 359/462; 359/888
[58] Field of Search ..................... 359/462, 463, 359/888, 894

[56] References Cited

U.S. PATENT DOCUMENTS

| | | | |
|---|---|---|---|
| 2,883,906 | 4/1959 | Rehorn | 359/463 |
| 3,959,580 | 5/1976 | Chocol et al. | 359/463 |
| 4,132,468 | 1/1979 | Lo et al. | 359/463 |
| 4,668,063 | 5/1987 | Street | 354/112 |
| 4,717,949 | 1/1988 | Eichenlaub | 359/463 |
| 4,740,073 | 4/1988 | Meacham | 352/58 |
| 4,852,972 | 8/1989 | Wah Lo | 359/900 |
| 5,015,899 | 5/1991 | Lam | 355/22 |
| 5,568,313 | 10/1996 | Steenblik et al. | 359/463 |

FOREIGN PATENT DOCUMENTS

| | | |
|---|---|---|
| 0332959 | 12/1990 | European Pat. Off. . |
| 0602934 | 3/1995 | European Pat. Off. . |
| 3712170 | 10/1987 | Germany . |
| 3712170 | 2/1989 | Germany . |
| 2252175 | 7/1992 | United Kingdom . |

*Primary Examiner*—Jon W. Henry
*Attorney, Agent, or Firm*—Michael J. Striker

[57] ABSTRACT

The apparatus for providing an autostereoscopic view of three dimensional structures includes a display device including several different two-dimensional views of a three-dimensional structure, optical image forming devices arranged in front of the display device and a screen for forming images in an observation plane from light rays issuing from the optical image forming devices so that images of the two-dimensional views appear in respective observation zones in the observation plane. The optical image forming devices (AE) are provided with aperture stops and include a device for overlapping the observation zones (BZ6) to form overlapping zones (UZ6). The aperture stops are provided with edge regions having a continuous transitional decrease of light transmission from complete transmission at their edges to zero transmission at a predetermined distance from their edges.

3 Claims, 11 Drawing Sheets

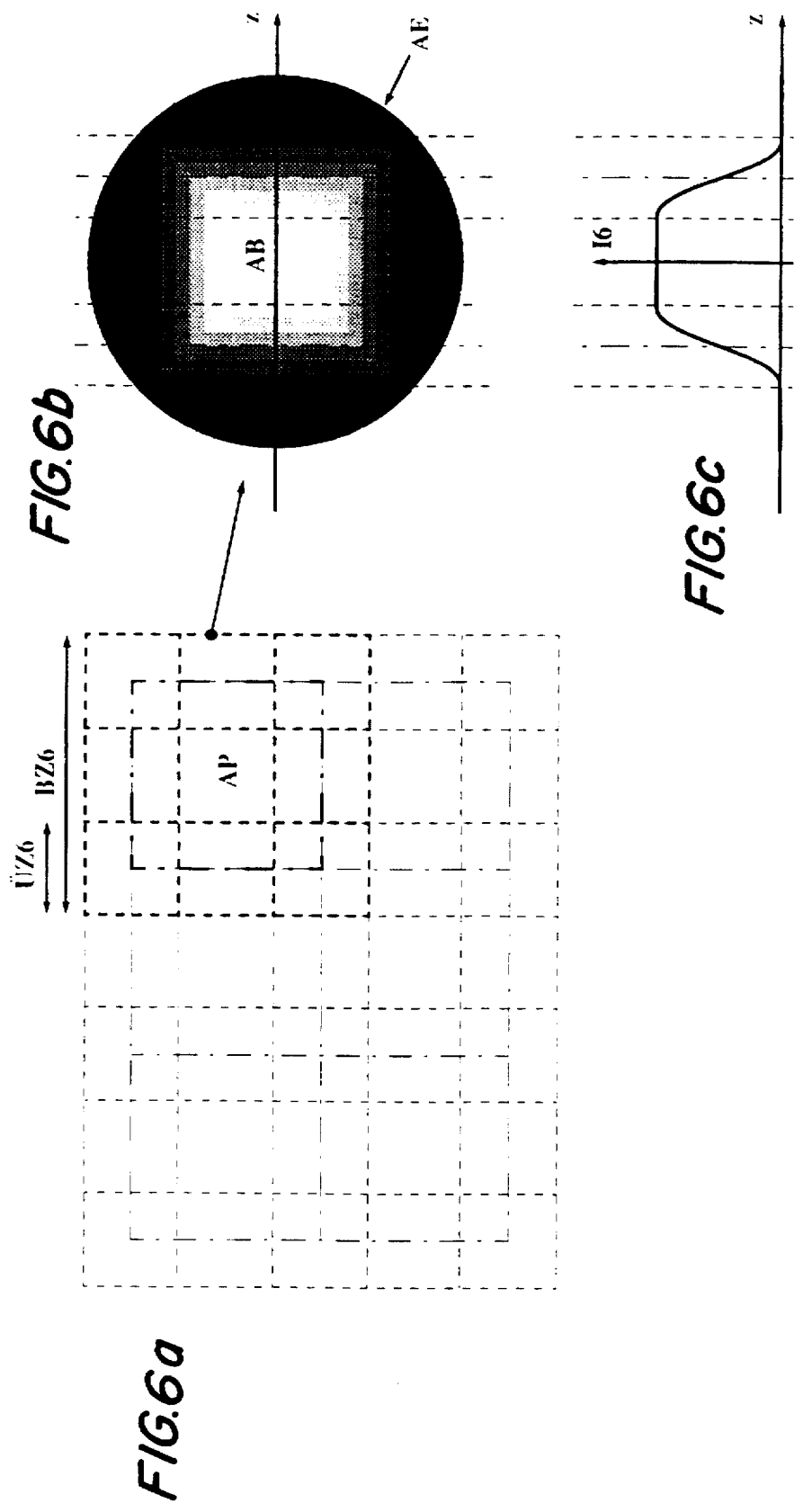

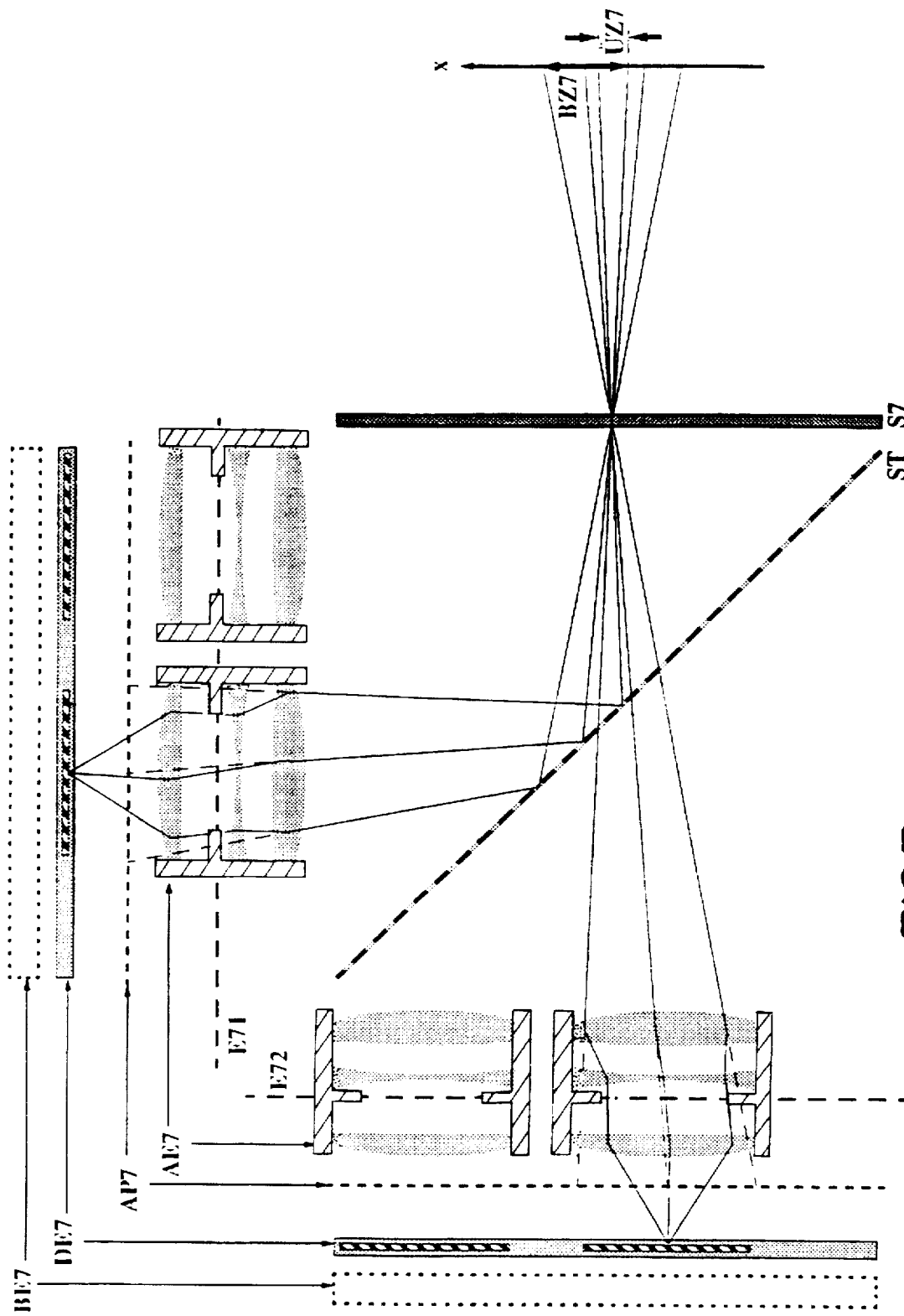

APPARATUS AND PROCESS FOR AUTOSTEREOSCOPIC VIEWING OF A THREE-DIMENSIONAL STRUCTURE

BACKGROUND OF THE INVENTION

The present invention relates to an apparatus and a process for autostereoscopic viewing of a three-dimensional structure.

An apparatus for an autostereoscopic viewing is known comprising a display device for making several different two-dimensional views of a three-dimensional structure, an optical image forming device arranged in front of the display device and a screen which forms images from the light rays issuing from the optical image forming device in an observation plane so that the two-dimensional individual views appear in zones in this observation plane observable with either the right eye or the left eye.

There are many applications in which a three-dimensional view provides advantages in contrast to only two-dimensional views. Autostereoscopic views are particularly useful in the medical field, especially for three-dimensional representations of X-ray images or computer tomograms, and in computer assisted design in the fields of machine assembly, architecture or chemistry. An apparatus for autostereoscopic viewing may also be used for three-dimensional visualization of scientific data and phenomenon or as video receiver for a television system with three-dimensional image reproduction.

Different proposals have already been made for providing an autostereoscopic view of three-dimensional structures. An apparatus of the above-mentioned type is, for example, described in German Patent 37 12 170. Autostereoscopic systems in contrast to stereoscopic systems have the advantage that several observers can see the three-dimensional image without auxiliary means and that a new perspective or view can be obtained by changing the observation position. Already systems were described with which over twenty individual views can be obtained. This is currently possible with holographic and other 3D-techniques.

It is disadvantageous however that in the currently known systems discontinuous or irregular changes of the three-dimensional image occurs because of the discrete number of views during lateral motion of the observer. These discontinuous changes of the image are perceived as very troublesome by the observer during lateral motion. These discontinuous image changes also occur when the image is observed from a distance to the screen which is not the optimum distance.

SUMMARY OF THE INVENTION

It is an object of the present invention to provide a process and apparatus for providing autostereoscopic views of a three-dimensional structure while avoiding the above-described disadvantages.

This object and others which will be made more apparent hereinafter are attained in a method for autostereoscopic viewing of a three-dimensional structure comprising the steps of reproducing several two-dimensional views of a three-dimensional structure in an observation plane so that the two-dimensional individual views appear in zones observed by either the left or the right eye.

According to the invention the method includes producing overlapping regions in which the observation zones overlap and reducing the lighting intensity in the observation zones at edges of the observation zones.

According to the invention the apparatus for providing autostereoscopic views of a three-dimensional structure includes an optical image forming device having aperture stops, which produce overlapping observation zones in transitional regions, and means for reducing lighting intensity at the edges of the aperture stops.

These overlapping regions allow a continuous mixing of the individual views during motion of the observer. The troublesome discontinuities in the image produced by the known prior art systems are avoided. Because of the decrease of the light intensity at the edges of the aperture stops, which advantageously can occur continuously and in a manner so that a uniform intensity distribution over all observation zones results, intensity discontinuities in the overlapping zones are avoided. Because of that, the discontinuous changes in the individual images observed when viewing the image from a nonoptimum distance at which regions of different two-dimensional views are simultaneously received with one eye are reduced or at least improved. Further details of advantageous embodiments of the process and apparatus for making autostereoscopic views according to the invention appear in the appended claims.

In some embodiments of the apparatus of the invention, the screen is advantageously a Fresnel lens. The display device may be advantageously at least one liquid crystal display.

BRIEF DESCRIPTION OF THE DRAWING

The objects, features an d advantages of the present invention will now be illustrated in more detail by the following detailed description, reference being made to the accompanying drawing in which:

FIGS. 6a, 6b and 6c are diagrammatic illustrations of overlapping pupils of aperture stops and the structure of an aperture stop with continuous transmission at the edges;

FIG. 7 is a diagrammatic sectional view through another second embodiment of an apparatus for autostereoscopic viewing according to the invention;

DESCRIPTION OF THE PREFERRED EMBODIMENTS

Figure 1A:
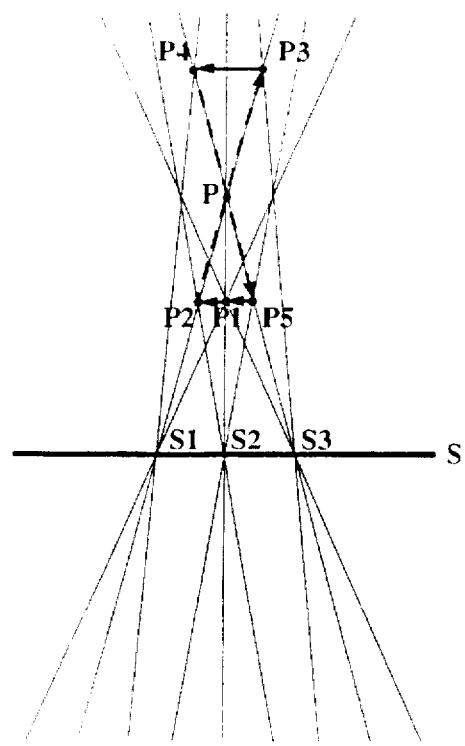
FIGS. 1a and 1b are respective diagrammatic illustrations showing the discontinuous image changes due to lateral motion of the observer in prior art autostereoscopic systems and of the variation of image intensity in the plane of observation.

Preferred embodiments of the apparatus according to the invention for autostereoscopic viewing are shown in the drawing. Portions of the surfaces of the apparatus shown in the drawing are shaded or dark to improve the clarity of the illustrations.

Figure 1B:
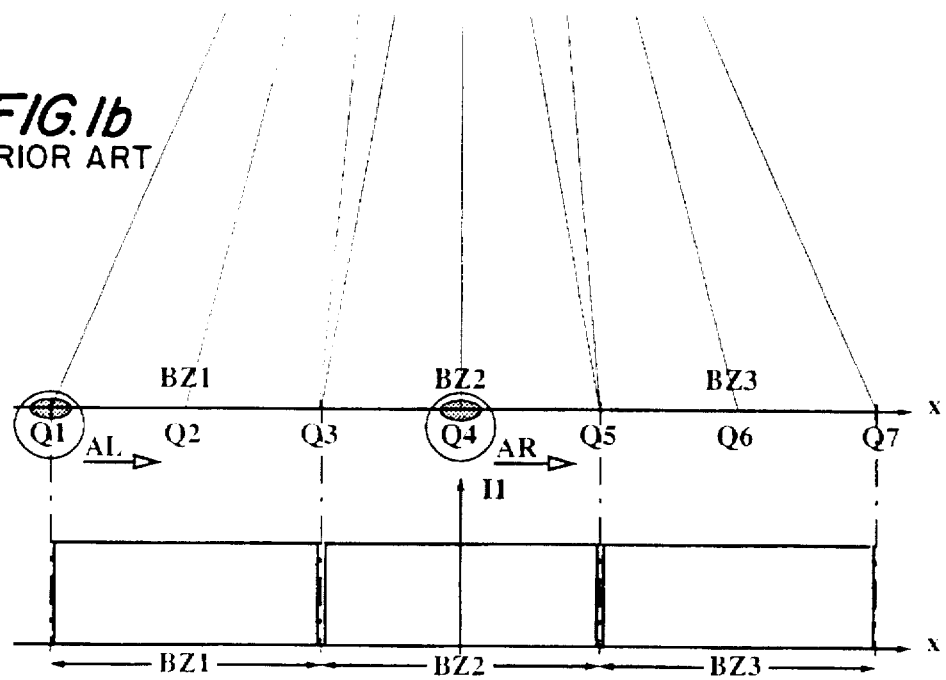

In FIG. 1 the effects of lateral motion of the observer in a prior art autostereoscopic system with sharply defined observation zones are clearly illustrated. Three observation zones BZ1 to BZ3 and a screen S of the prior art autostereoscopic systems are shown in FIG. 1. The variation of the image intensity I1 in the horizontal direction in the individual observation zones BZ1 to BZ3 is also shown diagrammatically in the bottom portion of FIG. 1. Three images S1, S2, S3 of a space point P are observable on the screen S of the apparatus from the respective observation zones BZ1, BZ2 and BZ3. The image SI, S2 or S3 is located on the screen S at the intersection point of a connecting ray which runs through the space point P and the center Q2, Q4 or Q6 of the respective observation zone BZ1, BZ2 or BZ3. The left eye AL of an observer is first located at the left edge Q1 of the observation zone BZ1 and the right eye AR in the center Q4 of the observation zone BZ2. The space point P appears at the position P1, which is determined by the intersection point of both straight lines through the points Q1 and S1 and also Q4 and S2. During a lateral motion of the observer to the right the space point P appears to move from the position P1 to P2, until the right eye AR arrives at the boundary of the observation zone at the position Q5. When the right eye AR crosses the boundary of the observation zone at Q5 the position of the space point P appears to change discontinuously or irregularly from the position P2 to the position P3. During further motion of the observer to the right the space point P appears to move to a new position P4. Then the left eye AL arrives at the boundary of the observation zone at Q3. When the left eye crosses the boundary at Q3 the space point P appears to again discontinuously move from the position P4 to P5. If the observer then reaches the position Q7 with his or her right eye AR, the space point again appears to return to the position P1 in a discontinuous manner. These troublesome discontinuous changes of image are avoided by the present invention.

Figure 2A:
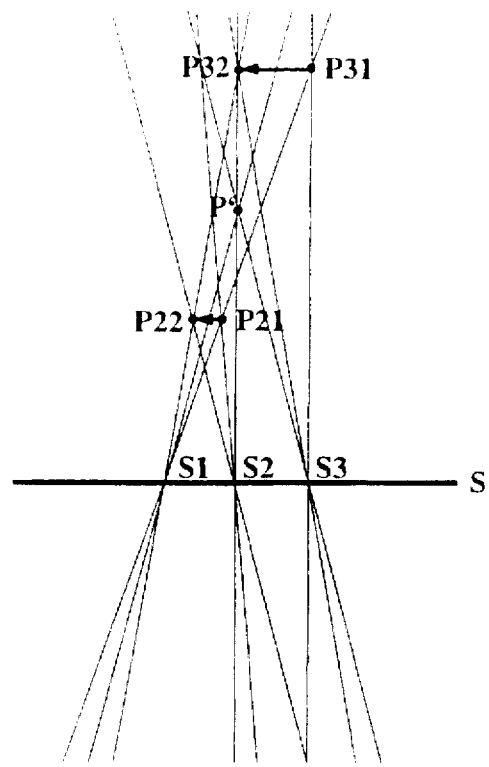
FIGS. 2a and 2b are respective diagrammatic illustrations of the continuous image variation due to lateral motion of the observer in autostereoscopic systems according to the invention and of the variation of the image intensity in the plane of observation.
Figure 2B:
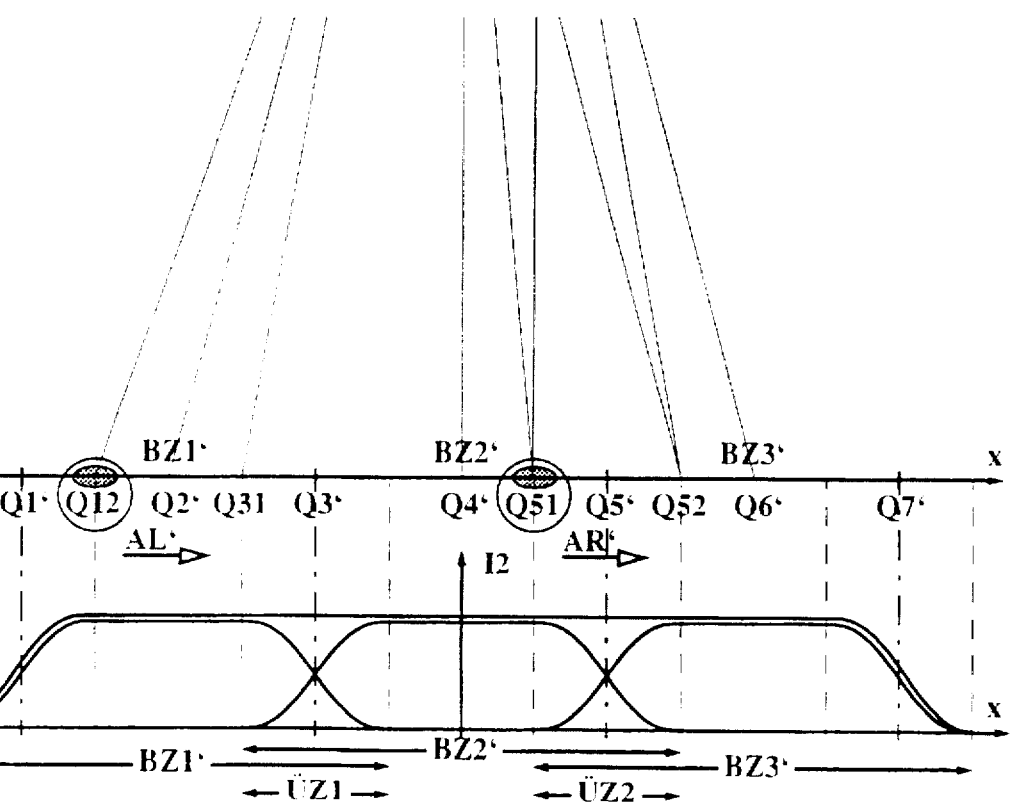

FIG. 2 shows the view of the space point P corresponding to FIG. 1 during lateral motion of the observer, when a method according to the invention, in which overlapping zones ÜZ1 and ÜZ2 are formed between the observation zones BZ1', BZ2' and BZ3', is used. The image intensities I2 shown in the bottom half of FIG. 2 change continuously in these overlapping zones ÜZ1 and ÜZ2 in such a way that the sums of the individual contributions of the observation zones BZ1' and BZ2'and/or BZ2'and BZ3' remain constant, as can be seen from the diagram shown in FIG. 2 for the image intensity I2. At the beginning of the path of motion of the observer the left eye AL' of an observer according to FIG. 2 is located at position Q12 and the right eye AR' at position Q51. A space point P is perceived first at the position P21. If the observer now moves to the right, until the left eye AL' reaches the position Q31 and the right eye AR' moving through the transitional overlap zone ÜZ2 reaches the position Q52, the space point P appears to move from the position P21 to the position P22. Simultaneously the space point whose brightness continuously increases is observable apparently moving from the position P31 to P32. At the end of the apparent motion path only the point at the position P32 is observable. The discontinuous change of the point position, as in the example shown in FIG. 1, is improved in this first embodiment of the method according to the invention by a continuous mixing or overlapping during a lateral motion of the observer.

Figure 3:
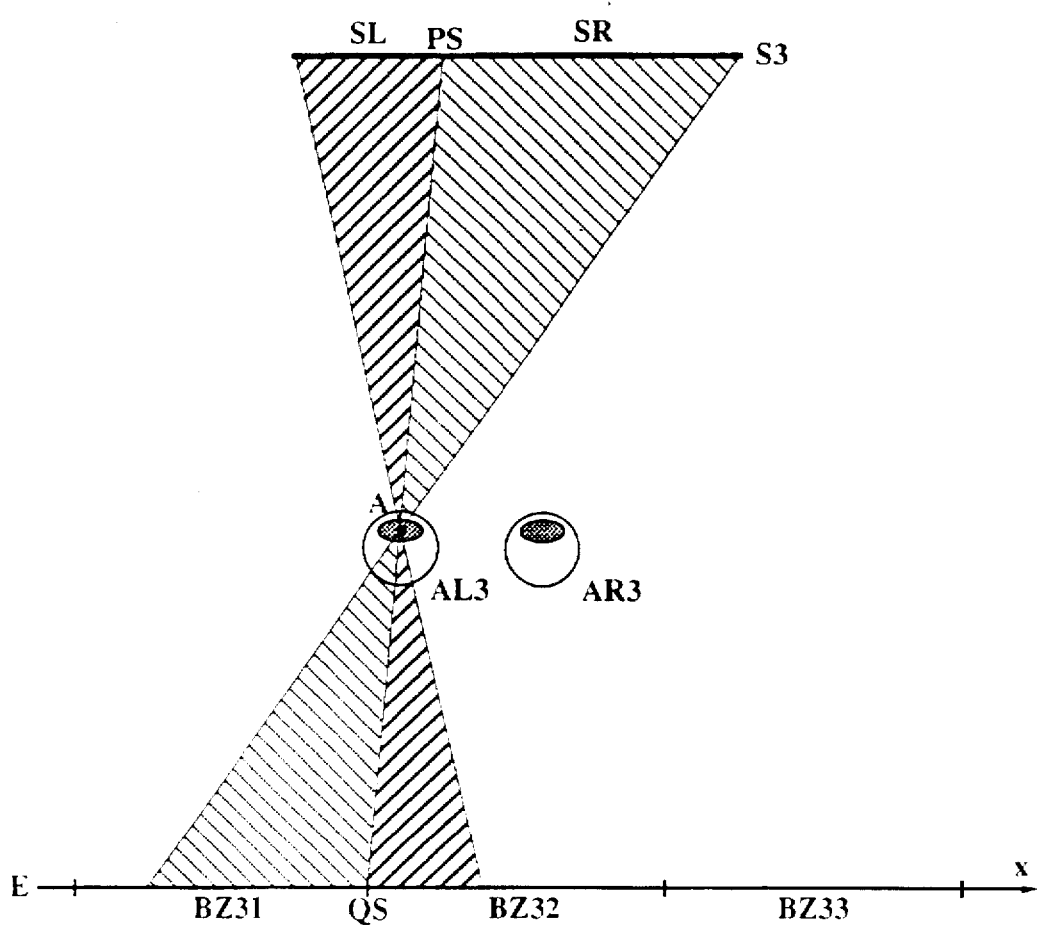
FIG. 3 is a ray diagram in an observation space of an autostereoscopic system during observation from a nonoptimum distance.
Figure 4A:
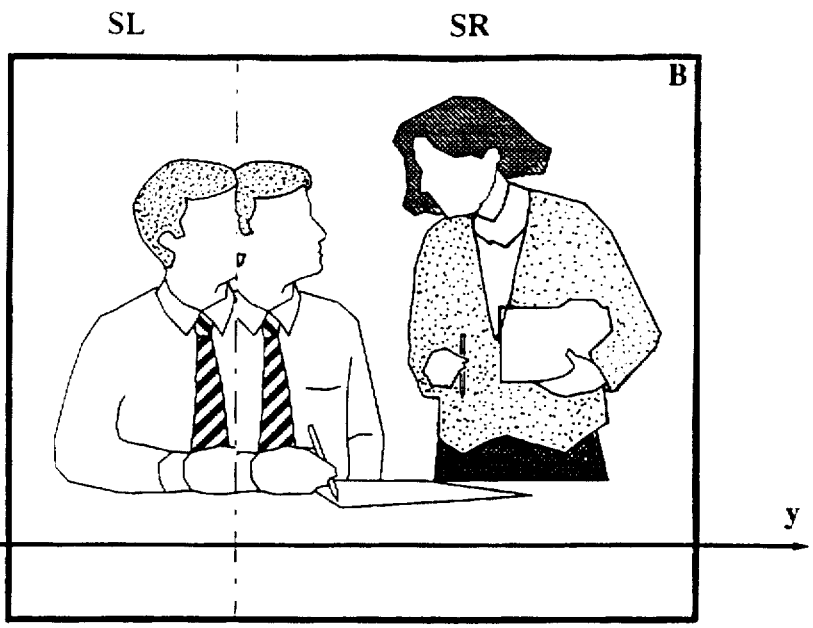
FIGS. 4a, 4b and 4c are examples of a view put together from different display screen zones, which is perceived during observation from the nonoptimum distance according to FIG. 3 and graphical illustrations of the image intensities of the image with and without overlapping zones.
Figure 4B:
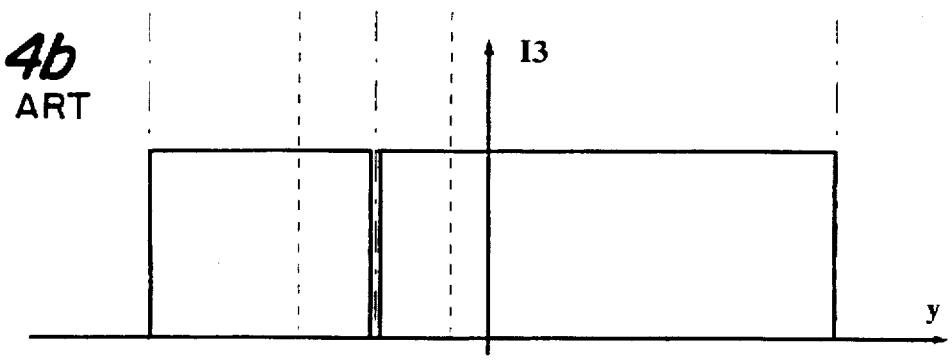
Figure 4C:
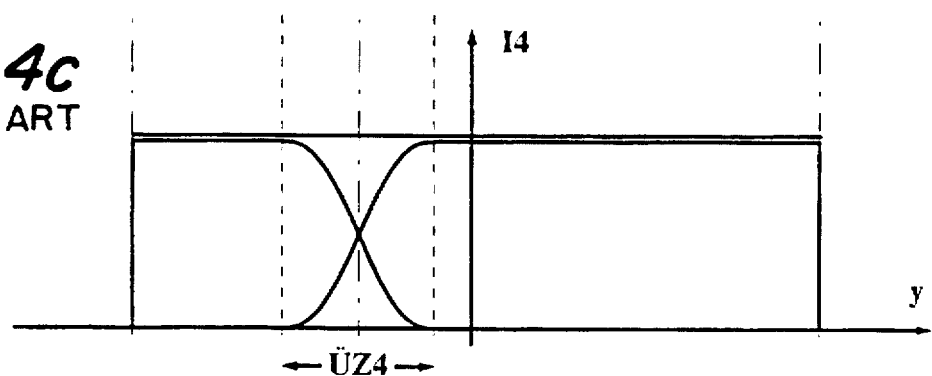

FIG. 3 and 4 clearly illustrate image presentation in an autostereoscopic system, if the observer finds himself or herself at the optimum observation plane. In FIG. 3 three sharply delineated observation zones BZ31 to BZ33 are illustrated in the optimum observation plane E. Furthermore the ray path through the pupil A of the left eye AL3 of the observer is shown. The image on a screen S3 perceived by the left eye AL3 of an observer results in the following way: In the left screen region SL the rays pass through the point A and originating from the screen S3 intersection the observation plane E in the observation zone BZ32. As a result the second two-dimensional view of the image appears on the left screen region SL. The rays of the right screen region SR pass through the observation zone BZ31 and the first two-dimensional view may be observable. The boundaries between the left and the right screen region SL and SR are established by the intersection point PS between the screen S3 and the connecting line which passes through the point A and the observation zone boundary at the position QS. The image perceived by the left eye is thus put together from two screen regions SL and SR, which have a sharp border between each other. Since different views in the different screen regions are produced, also the screen content changes discontinuously at the border PS of the screen regions. If however a transitional region is formed at the boundary QS of the observation zones BZ31 and BZ32 according to the invention, a transitional region also arises at the boundary PS of the screen regions. This is clearly shown in FIG. 4. FIG. 4a) shows the image perceived by the left eye. The graphical illustration in FIG. 4b) shows the course of the image intensity I3 along the image zones in an autostereoscopic system with sharply delineated observation zone boundaries as in FIG. 3. In FIG. 4c) the behavior of the image intensity I4 in a display system according to the invention is shown. The course of the image intensity in the transitional region ÜZ4 between two observation zones is thus dimensioned so that the collective image intensities remains constant over all the screen regions.

Figure 5A:
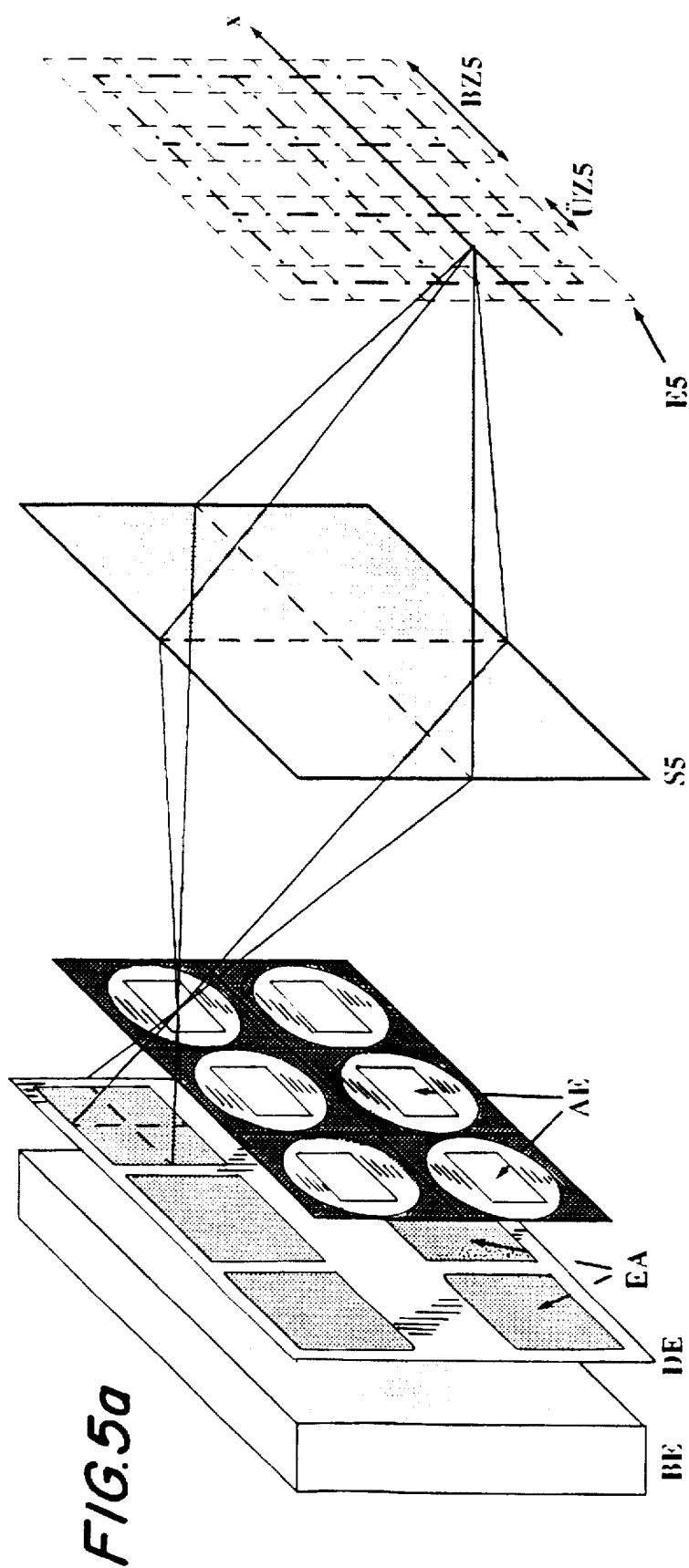
FIGS. 5a and 5b are diagrammatic perspective views of an apparatus with continuous overlapping of the observation zones and the associated image intensity in a horizontal direction.

FIG. 5a is a perspective view of a first embodiment of an apparatus for autostereoscopic viewing of three-dimensional structures according to the invention. A display device DE including six different two-dimensional views of an unillustrated three-dimensional structure is arranged in front of a lighting device BE. Each view EA is associated with an optical image forming device AE, which projects the rays originating from the individual views on a screen S5 with collecting and image forming properties. The individual views are observed in different observation zones BZ5 in an optimum observation plane E5 in front of the screen S5. The width of the observation zone BZ5 may not exceed the average eye spacing of 65 mm. Then the left and the right eye of an observer are positioned in front of different observation zones BZ5 and thus different views appear whereby a three-dimensional image appears. The so-called transitional zones or overlapping zones ÜZ5, which arise from an overlap of two observation zones BZ5, are arranged between the individual observation zones. Here special features of the optical image forming device AE provide that the intensity I5 at the edges of the individual observation zones BZ5 decreases so that collectively a constant intensity results over the collective observation zones BZ5.

Figure 5B:
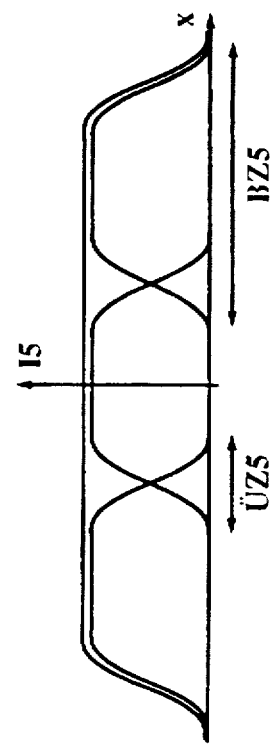

A possible embodiment of an image forming device AE is shown in FIG. 6b. The image forming devices AE are arranged so that their outlet pupils AP overlap so that the transitional regions ÜZ5 shown in FIG. 5 result. The light intensity I6 according to the invention continuously decreases to zero at the edges of the outlet pupils AP. This is achieved by an appropriate variation of light intensity in the aperture stops AB of the image forming devices AE. Particularly the desired variation of the light intensity is obtained because the edge of the aperture stop AB has a continuous transitional change of light transmission to zero transmission at a predetermined distance from the edges of the aperture stop AB as shown in FIGS. 6b and 6c.

FIG. 7 is a sectional view of another embodiment of the apparatus according to the invention in which the individual views are arranged in the display elements DE7 similar to the associated image forming devices AE7 in different planes E71 and E72 arising perpendicularly to each other. Because of that the outlet pupils AP7 of the individual image forming devices AE7 may be easily overlapped. The optical axes of the individual image forming devices AE7 are guided together by an optical beam splitter ST.

Figure 8:
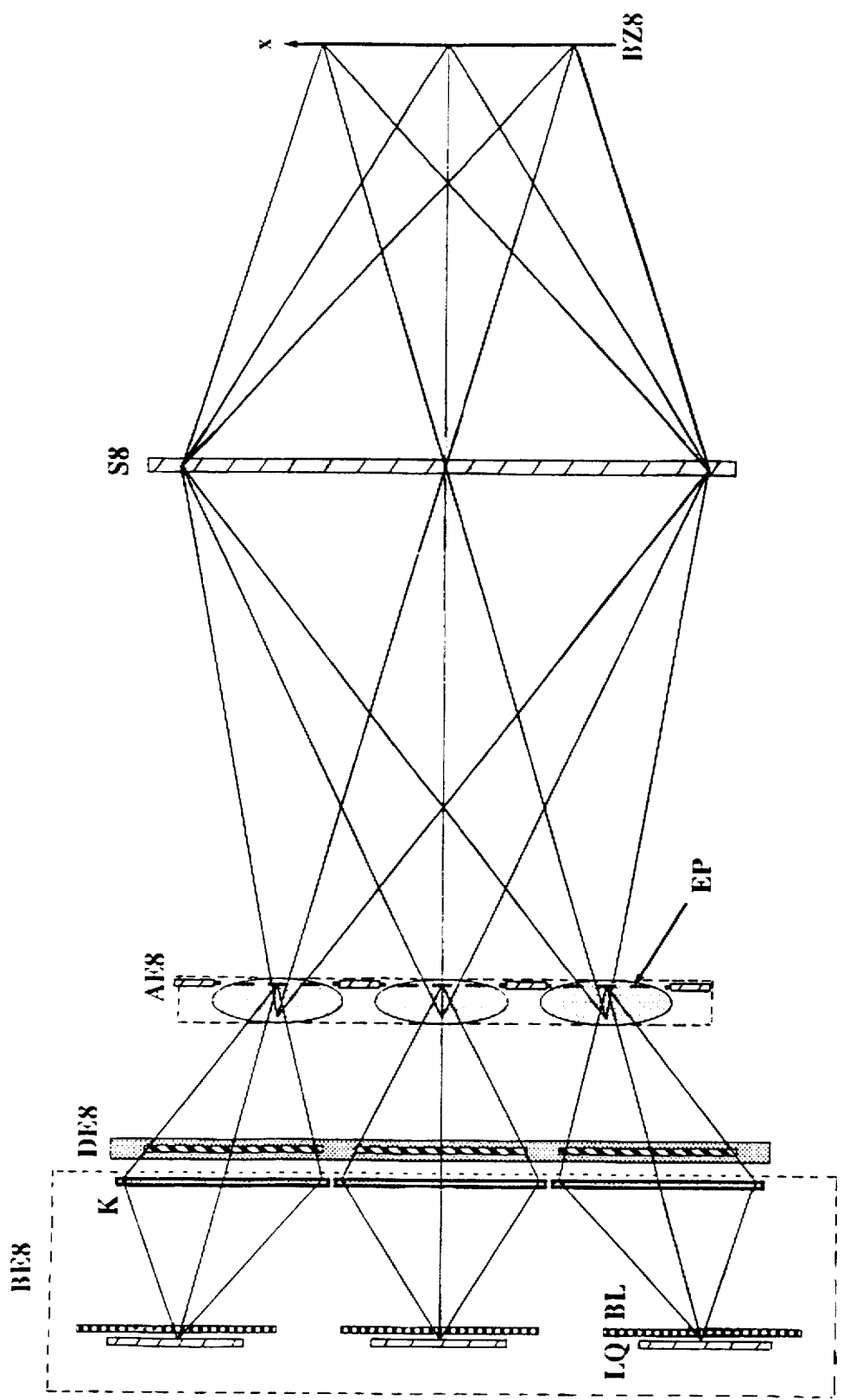
FIG. 8 is another diagrammatic sectional view through another embodiment of an apparatus for autostereoscopic viewing with several light sources.
Figure 9:
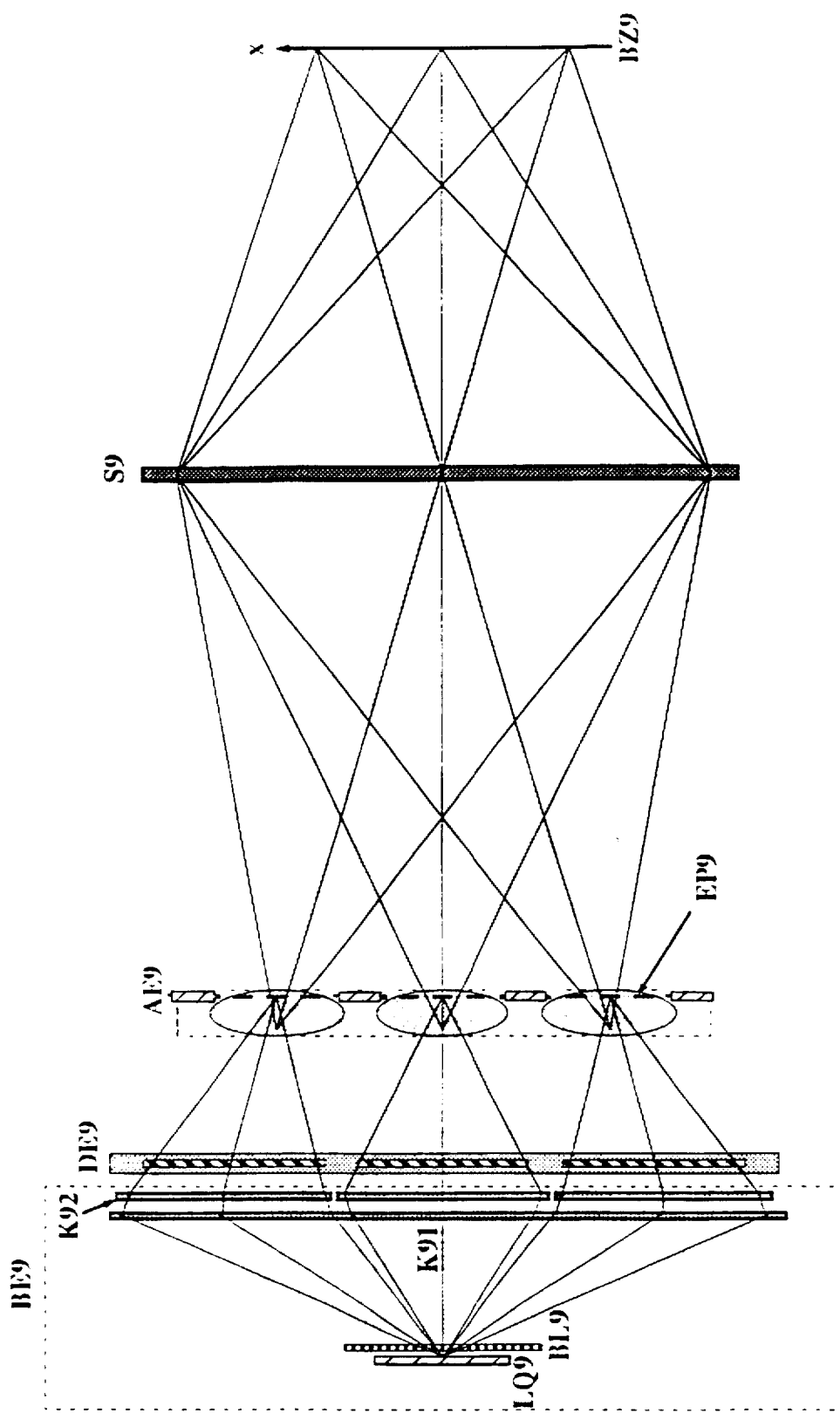
FIG. 9 is another diagrammatic sectional view through another embodiment of the apparatus for autostereoscopic viewing with a single light source.

FIGS. 8 and 9 show different embodiments of the lighting device which is required with displays which are not self-illuminating. In FIG. 8 the lighting device BE8 has three different light sources LQ corresponding to the three views arranged on the display device DE8. Each of the light sources LQ has a condenser K, with whose help a view produced on a display device DE8 by the light source LQ is focussed on the entrance pupil EP of the associated image forming device AE8. The surface of the light source must be sufficiently large to be able to illuminate the entrance pupil EP completely.

In FIG. 9 the lighting device BE 9 has only one light source LQ9. A first stage large surface condenser K91 is arranged in front of the light source LQ9 which serves for illumination of the display device DE9. Three individual second stage condensers K92 are arranged in front of the first stage condenser K91, which focusses the light source LQ9 on the entrance pupil EP9 of the individual image forming device AE9. A continuous decrease of the light intensity at the edges of the aperture stops of the image forming device AE9 can be accomplished here by means of a light stop BL9 which has an appropriate transmission behavior at its edges arranged in front of the light source LQ9. The condensers K91 and K92 produce an image of the aperture stop BL9 in the entrance pupil EP9 of the image forming device AE9. In this case the image forming device AE9 is equipped with conventional aperture stops.

Figure 10A:
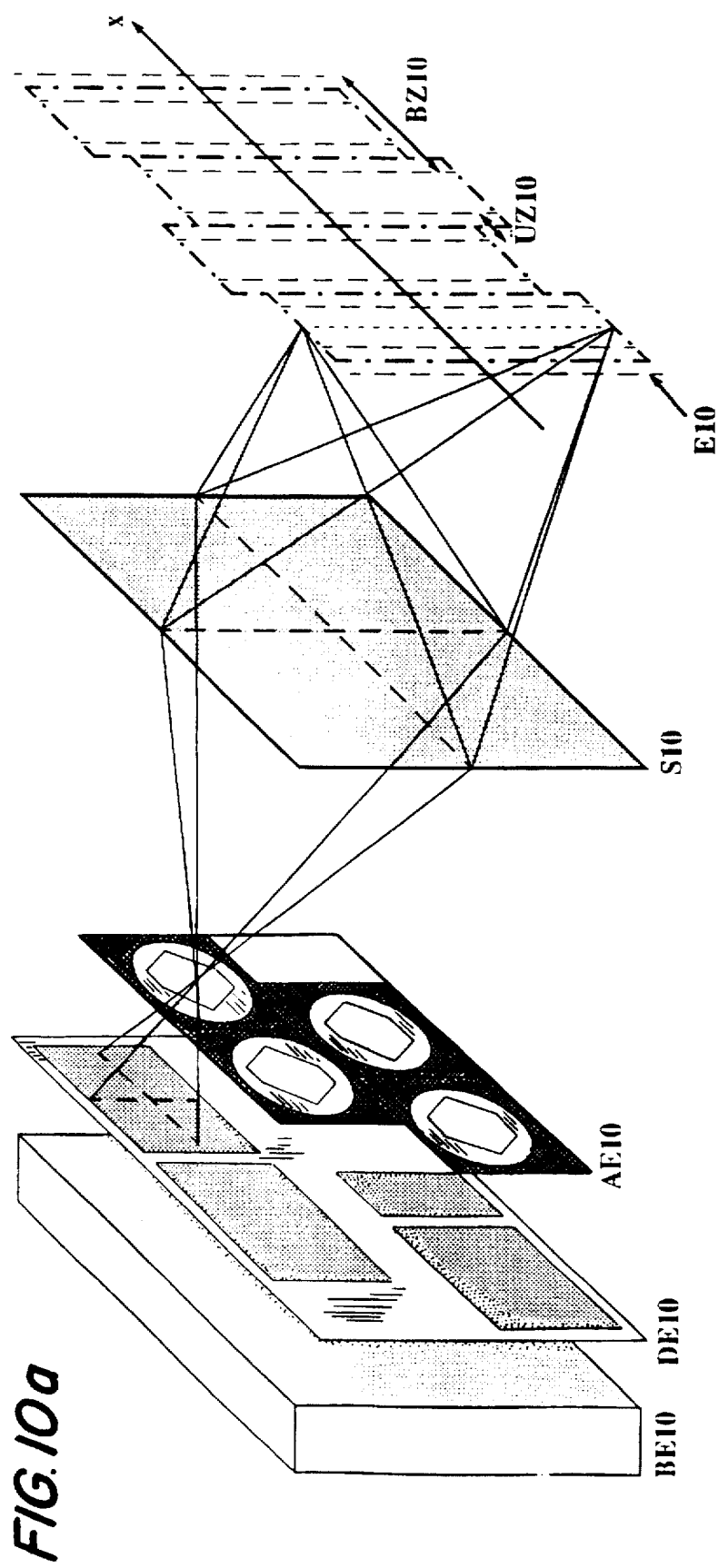
FIGS. 10a and 10b are a perspective view through another embodiment of an apparatus for autostereoscopic viewing according to the invention and a graphical illustration of the image intensity behavior in a horizontal direction.
Figure 10B:
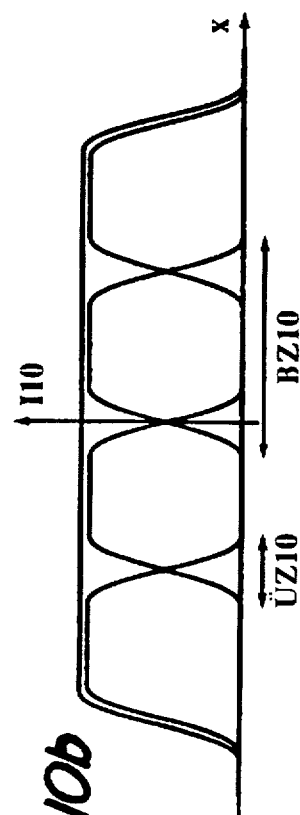

FIG. 10 shows another embodiment of an apparatus according to the invention in which a division of the observation plane E10 into individual observation zones BZ10 occurs only in a horizontal direction x. The screen S10 has in this case image forming properties in a horizontal direction and light scattering properties in a vertical direction. For example it can be a Fresnel lens and a cylindrical lens-grating plate with horizontal orientation of the cylinder axes. The individual views on the display device DE10 can now be arranged shifted in a vertical direction relative to each other. Image forming devices AE10 with appropriately structured aperture stops allow the production of overlapping zones ÜZ10 between the individual observation zones BZ10, in which the total summed intensity I10 remains constant.

Figure 11A:
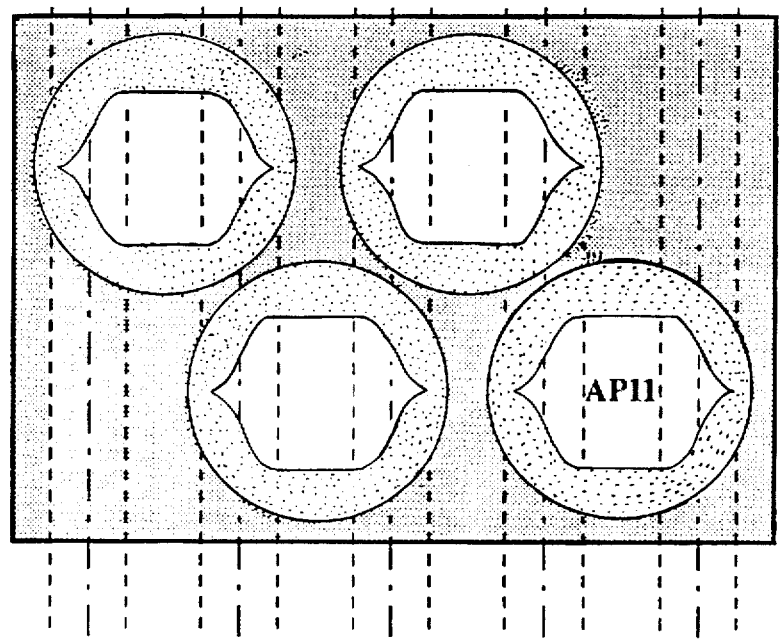
FIGS. 11a and 11b are a diagrammatic representation of the image forming device in the apparatus shown in FIG. 10 and a graphical illustration of associated image intensities in a horizontal direction.
Figure 11B:
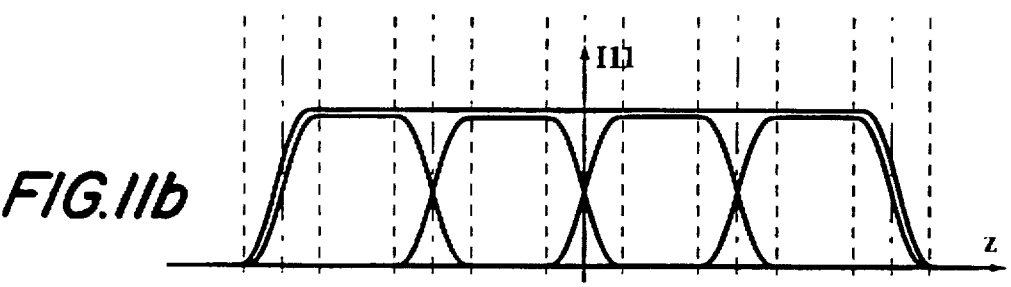

A possible structure of the outlet pupil AP11 with vertical displacement of the image forming devices is shown in FIG. 11. This vertical displacement of the individual views and the image forming devices allows a simpler formation of the overlapping zones than an arrangement of the image forming devices in a horizontal plane.

While the invention has been illustrated and described as embodied in a process and apparatus for making autostereoscopic views of three-dimensional structures, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

We claim:

1. An apparatus for providing an autostereoscopic view of three dimensional structures, said apparatus comprising a display device for viewing a plurality of different two-dimensional views of a three-dimensional structure, a plurality of optical image forming devices arranged in front of the display device and a screen for forming images in an observation plane from light rays issuing from the optical image forming devices so that images of said two-dimensional views appear in respective observation zones in said observation plane, said observation zones being observable either with a right eye or with a left eye of an observer; wherein said optical image forming devices (AE) have aperture stops which comprise means for overlapping said observation zones (BZ6) to form overlapping zones (UZ6) and means for reducing lighting intensity (I6) at edges of said aperture stops; and wherein each of said aperture stops (AB) is provided with an aperture and a continuous transitional change of light transmission through an edge region thereof bordering said aperture for reduction of said lighting intensity (I6).

2. The apparatus as defined in claim 1, wherein said display device (DE) comprises at least one liquid crystal display.

3. An apparatus for providing an autostereoscopic view of three dimensional structures, said apparatus comprising a display device for viewing a plurality of different two-dimensional views of a three-dimensional structure, a plurality of optical image forming devices arranged in front of the display device and a screen for forming images in an observation plane from light rays issuing from the optical image forming devices so that images of said two-dimensional views appear in respective observation zones in said observation plane, said observation zones being observable either with a right eye or with a left eye of an observer; wherein said optical image forming devices (AE) have aperture stops which comprise means for overlapping said observation zones (BZ6) to form overlapping zones (UZ6) and means for reducing lighting intensity (I6) at edges of said aperture stops; and wherein said aperture stops (AB) are provided with edge regions having a continuous transitional decrease of light transmission from complete transmission at said edges of said aperture stops to zero transmission at a predetermined distance from said edges.

* * * * *